United States Patent
Kuntze-Fechner et al.

(10) Patent No.: US 9,359,071 B2
(45) Date of Patent: Jun. 7, 2016

(54) AERODYNAMIC BLADE ATTACHMENT FOR A BEARINGLESS ROTOR OF A HELICOPTER

(71) Applicant: AIRBUS HELICOPTERS DEUTSCHLAND GMBH, Donauworth (DE)

(72) Inventors: Gerald Kuntze-Fechner, Gmund Am Tegernsee (DE); Markus Bauer, Munich (DE); Martin Ortner, Unterhaching (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 588 days.

(21) Appl. No.: 13/785,696

(22) Filed: Mar. 5, 2013

(65) Prior Publication Data

US 2013/0315734 A1    Nov. 28, 2013

(30) Foreign Application Priority Data

Apr. 18, 2012 (EP) ..................................... 12400014

(51) Int. Cl.
*B64C 27/00* (2006.01)
*B64C 27/33* (2006.01)
*B64C 27/48* (2006.01)
*B64C 27/50* (2006.01)

(52) U.S. Cl.
CPC .................. *B64C 27/33* (2013.01); *B64C 27/48* (2013.01); *B64C 27/50* (2013.01)

(58) Field of Classification Search
CPC .......... B64C 27/48; B64C 27/33; B64C 27/50
USPC ............................... 416/134 A, 143, 141, 138
See application file for complete search history.

(56) References Cited

U.S. PATENT DOCUMENTS

| 2,815,820 A | * | 12/1957 | Papadakos | ............... | B64C 27/50 416/143 |
| 4,227,857 A | * | 10/1980 | Reyes | ..................... | B64C 27/43 416/134 A |

(Continued)

FOREIGN PATENT DOCUMENTS

| EP | 0288957 A2 | 11/1988 |
| EP | 0315962 A2 | 5/1989 |

OTHER PUBLICATIONS

Search Report and Written Opinion; Application No. EP 12400014; dated Sep. 28, 2012.

*Primary Examiner* — Bryan Lettman
*Assistant Examiner* — Christopher Bobish
(74) *Attorney, Agent, or Firm* — Brooks Kushman P.C.

(57) ABSTRACT

An aerodynamic blade attachment (1) for a bearingless rotor, particularly a main rotor, of a helicopter, comprising: an airfoil blade (2) having a tip end and a root end and having a pitch axis from said tip end to said root end; a flexbeam (3); a control cuff (4, 22) enclosing and extending along said flexbeam (3) and a separable junction arrangement between said flexbeam (3), said control cuff (4) and said root end of said airfoil blade (2). Said junction arrangement is mechanical between said flexbeam (3), said control cuff (4) and said root end of said airfoil blade (2). Removable fasteners (5, 6) connect said root end of said airfoil blade (2) and said control cuff (4) with said flexbeam (3). Said junction arrangement comprises fairing means (10, 27, 28, 31, 32 and 39) encompass the removable fasteners (5, 6) and said flexbeam (3).

19 Claims, 4 Drawing Sheets

(56) References Cited

U.S. PATENT DOCUMENTS

| | | |
|---|---|---|
| 4,427,340 A | 1/1984 | Metzger |
| 4,566,856 A | 1/1986 | Miller |
| 4,676,720 A * | 6/1987 | Niwa ................. B64C 27/51 416/134 A |
| 4,792,280 A | 12/1988 | Olsen |
| 4,893,988 A | 1/1990 | Sato |
| 4,975,021 A * | 12/1990 | Wagner ................ B64C 27/33 416/134 A |
| 5,263,821 A * | 11/1993 | Noehren ............... B64C 27/33 415/115 |
| 6,126,398 A | 10/2000 | Bauer |
| 6,196,800 B1 * | 3/2001 | Bauer .................. B64C 27/33 416/107 |
| 6,447,249 B2 * | 9/2002 | Potdevin ............... B64D 15/12 416/143 |
| 2006/0165527 A1 * | 7/2006 | Stamps ................ B64C 27/48 416/134 A |
| 2008/0101934 A1 | 5/2008 | Stamps |

\* cited by examiner

AERODYNAMIC BLADE ATTACHMENT FOR A BEARINGLESS ROTOR OF A HELICOPTER

CROSS REFERENCE TO RELATED APPLICATIONS

This application claims priority to European patent application No. EP 12 400014.2 filed on Apr. 18, 2012, the disclosure of which is incorporated in its entirety by reference herein.

BACKGROUND OF THE INVENTION (1) Field of the Invention

The invention relates to an aerodynamic blade attachment for a bearingless rotor of a helicopter, including a lift-generating airfoil blade, a flexbeam enclosed by a control cuff or torque tube, and a connection means forming a separable or releasable junction between the airfoil blade and the flexbeam and the control cuff. The flexbeam and the control cuff can be connected or not.

(2) Description of Related Art

During operation, the rotor blades are deflected in various directions and are thereby subjected to high loads in these various directions. The rotor blades must be designed to withstand these high loads while still providing the required flexibility or articulation to allow the blades to carry out flapping, lead-lag oscillating, and pitch angle variation movements.

Typically, a rotor blade of a bearingless rotor includes a structural element known as a flexbeam at the inner end of the blade connected to the rotor head. The flexbeam supports and transmits the centrifugal forces of the blade into the rotor head. Additionally, the flexbeam includes at least portions or regions that are flexural and torsion soft or flexible to allow the blade to undergo the above mentioned movements in a flapping direction, a lead-lag direction, and in a pitch angle direction. The torsion soft portion of the flexbeam is arranged within a torsion stiff control cuff or torque tube, transmitting the pitch angle control movements to the lift-generating airfoil blade portion of the rotor blade. The airfoil blade typically extends from the outboard end of the control cuff to the outermost end of the rotor blade, i.e. the blade tip.

The vibrations of the rotor blades, and particularly the oscillations in the lead-lag direction, must be damped by appropriate damping elements. The damping effectiveness of the damping elements is predominantly dependent on the effective transmission of the lead-lag oscillating movements of the airfoil blade into the damping elements. Any softness or lack of force transmission through the blade/cuff attachment to the damping element will reduce the overall resulting damping effect.

In order to allow the flexbeam/cuff unit and/or the airfoil blade to be separately manufactured and/or replaced in the event of damage, or in order to allow the airfoil blade to be pivoted and folded relative to the flexbeam/cuff unit, it is desired to provide a separable or releasable junction between the flexbeam/cuff unit and the lift-generating airfoil blade.

The separable or releasable junction is subject to high technical and mechanical demands, because it must reliably carry and transmit the substantially high centrifugal forces resulting during rotation of the rotor blade and it must reliably carry and transmit all bending moments from flapping and lead lag movements of the rotor blade. The rotor blade has a longitudinal main load axis next to 25% of the average airfoil chord of the blade profile, said main load axis being in practice essentially identical with the pitch axis of said rotor blade. At the level of the flexbeam said longitudinal main load axis next to 25% of the average airfoil chord of the blade profile corresponds to a longitudinal middle axis of the flexbeam.

The document US 2008/101934 A1 discloses an assembly for providing flexure to a blade of a rotary blade system including an upper support plate having an upper curved surface, a lower support plate having a lower curved surface, and a yoke positioned there between. One embodiment includes an assembly for providing flexure to a blade of a rotary blade system, including, an upper support plate having an upper curved surface, a lower support plate having a lower curved surface, and a yoke positioned there between and directly contacting the support plates wherein one of the curved surfaces is a non-circular arc that does not form part of the circumference of a circle.

The document EP 0315962 A2 discloses a helicopter rotor blade supported by a flexbeam to be rotatable about an axis of rotation, in which a pitching motion thereof is allowable. The rotor blade is provided with a device for changing the pitch and damping the lead-lag motion thereof. The device comprises a bushing in a hole formed at the inboard end of the flexbeam, an elastomeric pivot loosely fitted in the bushing, elastomeric dampers of cylindrical shape mounted on the upper and lower surfaces of the flexbeam and coupled with the upper and lower ends of the elastomeric pivot by means of nuts, and torque arms extending through the bushing and the elastomeric dampers and having the central portion thereof connected to central shafts of the elastomeric pivots. Each of the pitch sleeves has both ends outwardly projecting beyond the elastomeric dampers and secured to a pitch sleeve which encloses the flexbeam. Therefore, the relative position between the pitch sleeve and the elastomeric pivot does not change even when lead-lag motion is imparted to the rotor blade.

The document U.S. Pat. No. 4,427,340 A discloses helicopter rotors and more particularly rotor mounting involving a composite fiber-reinforced unitary yoke with resilient in plane restraints.

The document U.S. Pat. No. 6,126,398 A discloses a rotor blade for a bearingless rotor of a helicopter with a lift-generating airfoil blade, a flexbeam connecting the airfoil blade to a rotor head, and a control cuff enclosing the flexbeam. The junction between the flexbeam and the airfoil blade is separable to allow the airfoil blade to be folded in a simple manner while maintaining a high lead-lag stiffness and reduced structural height of the junction. The junction is formed by two connection arms arranged side-by-side in the lead-lag plane of the rotor blade.

The document EP 0288957 A2 discloses a helicopter rotor flexbeam with a pair of generally parallel outwardly open, cross-sectionally C-shaped beams of a geometry which defines therein a first inboard region (A) of enhanced out-of-plane flexibility and a second outboard region (B) of enhanced in-plane and torsional flexibility.

The document U.S. Pat. No. 4,566,856 A discloses a hub moment for a tilt rotor provided by U-shaped springs that extend outwardly from the rotorshaft and in-plane with the tilt point (P) and inwardly to the tiltable hub member in the rotor plane, which is above the tilt point (P). Driving torque is supplied to the rotor via a torque disc that has a resilient diaphragm portion attached to the rotorshaft in-plane with the tilt point (P) and a rigid rim attached to the tiltable hub member in the rotor plane. The torque disc comprises the lower half of an aerodynamic fairing which encases the hub.

BRIEF SUMMARY OF THE INVENTION

It is an object of the invention to provide an improved configuration of an aerodynamic blade attachment for a bearingless rotor of a helicopter and particularly to provide a separable or releasable junction between an airfoil blade and a flexbeam/cuff unit to allow folding of the rotor blade and improve drag behavior. It is a further object of the invention to provide an especially simple and economical junction arrangement for an aerodynamic blade attachment.

The above objects have been achieved with an aerodynamic blade attachment for a bearingless rotor of a helicopter with the features of claim 1 of the invention. Preferred embodiments of the invention are presented in the subclaims.

According to the invention an aerodynamic blade attachment of a bearingless main rotor of a helicopter comprises an airfoil blade having a tip end and a root end forming opposite ends thereof. Said airfoil blade has a pitch axis from said tip end to said root end. The aerodynamic blade attachment further comprises a flexbeam including a flexbeam body and a flexbeam head at an end of said flexbeam body. Said flexbeam body is flexible so as to allow lead-lag movements, flapping movements and pitch movements of said airfoil blade.

The aerodynamic blade attachment still further comprises a control cuff enclosing and extending along at least a predominant portion of said flexbeam. A separable junction arrangement provides a separable connection between said flexbeam head and said control cuff on one side and said root end of said airfoil blade on the other side. Said junction arrangement is mechanical between said flexbeam head, said control cuff and/or said root end of said airfoil blade with removable fasteners respectively removable connecting said root end of said airfoil blade and said control cuff with said flexbeam head. Said junction arrangement is encased by fairing means encompassing the removable fasteners and said flexbeam head.

The invention allows a reduced total structural height at an extended width of the profile of the aerodynamic blade attachment without detracting from the mechanical strength of the junction arrangement. Consequently the inventive aerodynamic blade attachment achieves to configure the fairing means, e.g. the control cuff, with a reduced profile height at the root end of said airfoil blade and therewith an improved overall aerodynamic configuration is provided without any perturbing bolts projecting from the fairing means at the control cuff and/or at the root end of said airfoil blade. The airfoil blade, the flexbeam and the control cuff of the invention are separately fabricated and the flexbeam with the junction arrangement can be slit into the completed control cuff for simple and fast mounting. The airfoil blade is attached to the flexbeam/cuff unit by the removable fasteners. The control cuff of the invention is apt to drainage, i.e. removal of any water from the inside of said control cuff.

With the inventive aerodynamic blade attachment it is possible to pivot the lift-generating airfoil blade relative to the flexbeam and the control cuff in the lead-lag plane for the purpose of folding the blade into a folded configuration in a very quick and simple manner. Namely, it is simply sufficient to remove a single one of the removable fasteners of the inventive aerodynamic blade attachment, in order to allow the blade to be pivoted about the other remaining removable fastener to achieve the desired blade folding. With the inventive aerodynamic blade attachment an easy folding of the airfoil blades in both directions, forward and rearward is possible.

According to a preferred embodiment of the invention said fairing means are provided by the control cuff by means of a smooth transition area of the control cuff towards the root end of said airfoil blade.

According to a further preferred embodiment of the invention said fairing means are provided at the root end of said airfoil blade by means of a smooth transition area of said airfoil blade towards the control cuff.

According to a further preferred embodiment of the invention said fairing means are provided by at least one supplemental profile mounted at said junction arrangement either to the root end of said airfoil blade or to said control cuff.

According to a further preferred embodiment of the invention said fairing means are formed with at least one circular segment at a free end. A respective center of at least one circular segment is arranged offset from one removable fastener between the removable fasteners to provide for distance of the at least one circular segment at said free end from an opposed curb of the root end of said airfoil blade or from an opposed curb of the control cuff once said airfoil blade is rotated relative to the control cuff. With the offset and with the radius of the at least one circular segment at said free end being greater than the smallest distance from a central axis through one of the two removable fasteners to the at least one circular segment, the at least one circular segment of the airfoil blade pivoting around any one of the removable fasteners in the flexbeam/control cuff takes off from the at least one circular segment of the fairing means at the control cuff. The offset of the respective center of said at least one circular segment of said fairing means from the removable fasteners is 10-15 mm towards a profile middle.

According to a further preferred embodiment of the invention the radius of the at least one circular segment at the free end of said fairing means is greater than the distance from one of the removable fasteners to the free end.

According to a further preferred embodiment of the invention said control cuff is mechanically connected to said flexbeam, e.g. by means of adhesion, riveting, screws, etc. . . . . .

According to a further preferred embodiment of the invention said removable fasteners comprise at least two bolts being asymmetric with regard to said pitch axis of said rotor blade, preferably a main bolt and at least one supporting bolt. Said main bolt may have a diameter greater than the diameter of said at least one supporting bolt. Particularly according to the invention, the distances of each of the two bolts from the middle axis of the flexbeam can be different, to optimize the folding of the airfoil blade and to improve the lead lag kinematics by increasing the distances.

According to the invention, the aerodynamic blade attachment includes a main bolt and a supporting bolt that are both arranged lying perpendicular to the lead-lag pivoting plane of the rotor blade. In this context, the lead-lag pivoting plane essentially corresponds to the rotation plane of the rotor blade. The lead-lag pivoting stiffness at the separable or releasable junction is substantially increased by the maximized distance between said one main bolt and said supporting bolt. Said main bolt and said supporting bolt configuration allow an integration into the fairing means of the invention at a suitable location of the inventive aerodynamic blade attachment more easily than the arrangement of a plurality of equally charged bolts provided with any of the prior art arrangements as said main bolt with its bigger dimensions is advantageously located nearby the maximum thickness of the profile of the aerodynamic blade attachment.

The junction arrangement of the invention with the large distance between said main bolt and said supporting bolt also takes up and transmits the lead-lag moments so as to achieve a transfer from the airfoil blade into the lead-lag stiff control cuff, allowing improved efficiency of the lead-lag dampers arranged next to the control cuff/rotor head junction subsequently allowing less complex lead-lag dampers with reduced weight, smaller size and lower costs at fabrication and/or for maintenance during operation. The inventive aerodynamic blade attachment is provided with holes for attaching the main and supporting bolts. Preferably said main bolt is arranged in the area of a 10-30% chordwise axis of a profile section of said airfoil blade, preferably slightly in front of the pitch axis of said airfoil blade. With said arrangement the main bolt carries about 51-100% and the supporting bolt about 49-0% of the centrifugal and lead-lag loads.

According to a further preferred embodiment of the invention said control cuff is formed with a frontal slit and a rear slit adjacent to said flexbeam head to allow forward folding of the blade by means of the main bolt and rearward folding of the blade by means of the supporting bolt.

BRIEF DESCRIPTION OF THE DRAWINGS

In order that the invention may be clearly understood it will now be described in connection with preferred example embodiments, with reference to the accompanying drawings, wherein.

DETAILED DESCRIPTION OF THE INVENTION

Figure 1:
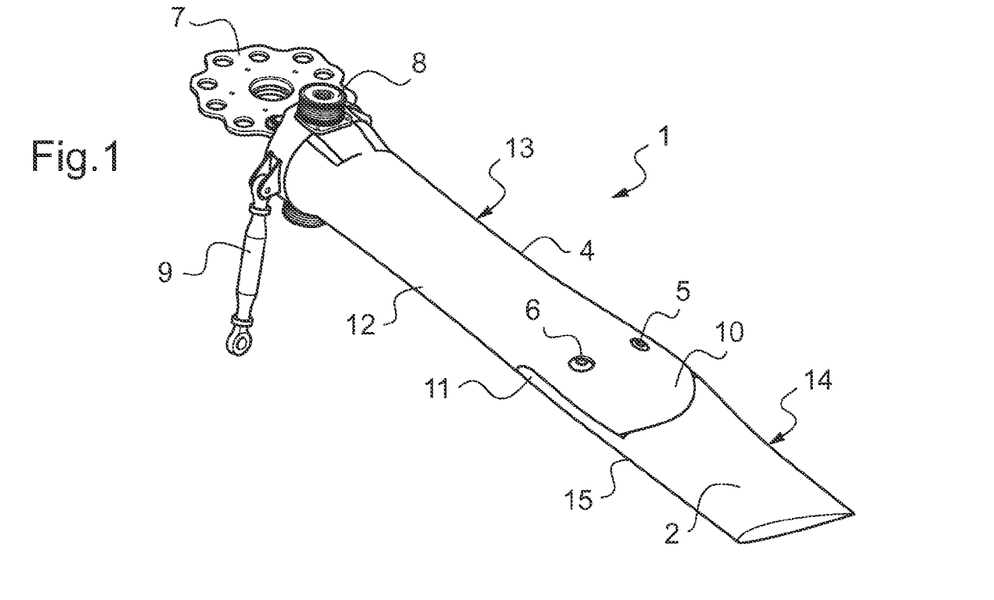
FIG. 1 is a perspective view of a rotor section with a breakdown of the main components of an aerodynamic blade attachment according to the invention.

According to FIG. 1 an aerodynamic blade attachment 1 for a bearingless rotor of a helicopter (not shown) comprises an airfoil blade 2 and a flexbeam (see FIGS. 2, 4 and 5) inside a torsion stiff control cuff or torque tube 4 enclosing the flexbeam. The airfoil blade 2 is mounted by means of two removable fasteners 5, 6 to the flexbeam and the control cuff 4.

The two removable fasteners 5, 6 comprise a main bolt 5 and a supporting bolt 6. The main bolt 5 is conceived to carry higher loads than the supporting bolt 6.

The root end 42 of the flexbeam is mounted to a rotor head 7. A lead lag damper 8 is arranged on the control cuff 4 next to the rotor head 7. A pitch control 9 is mounted to the control cuff 4.

The control cuff 4 is provided with fairing means 10 with a smooth transition area from the control cuff 4 to a root end of said airfoil blade 2. The control cuff 4 is further provided with a rearward slit 11 along a peak of a trailing edge 12 of the control cuff 4 and with a forward slit (see FIG. 7) along a peak of a leading edge 13 of the control cuff 4.

A longitudinal pitch axis next to 25% of the chord of the blade profile extends along the airfoil blade 2 to its tip end 41 through the main bolt 5. In operation of the helicopter each airfoil blade 2 rotates about an essentially vertical rotor head axis (see FIG. 9), whereby each airfoil blade 2 rotates with its longitudinal axis in a rotor blade plane. The airfoil blade 2 has a leading edge 14 and a rear edge 15.

Figure 2:
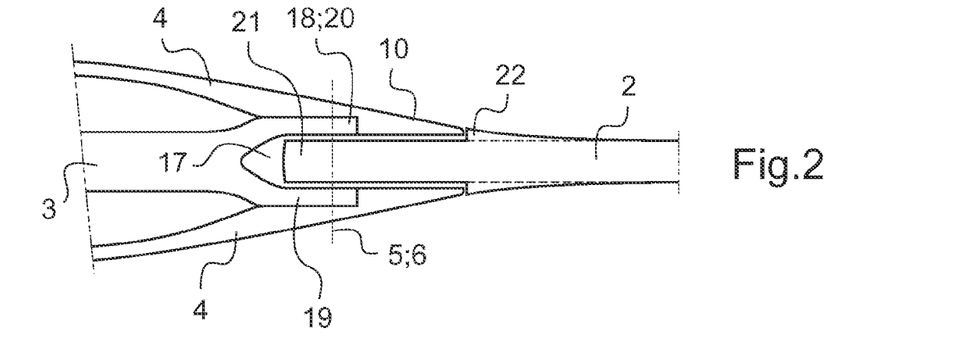
FIG. 2 is a cross sectional view of the aerodynamic blade attachment according to the invention.

According to FIG. 2 corresponding features are referred to with the same references as in FIG. 1. A root end of the airfoil blade 2 is received in a gap or recess 17 between upper and lower fork flanges 18, 19 of the fork shaped flexbeam head 20. The upper and lower fork flanges 18, 19 are provided with essentially flat surfaces adapted to an inner circumference of the control cuff 4 and an outer circumference of the root end of the airfoil blade 2. A regular transition with a possibly large curvature is provided between said upper and lower fork flanges 18, 19 at the gap 17 of the fork shaped flexbeam head 20.

The fork shaped flexbeam head 20 of the flexbeam 3 and the root end 21 of the airfoil blade 2 are each provided with respectively coaxial holes for the main bolt 5 and a supporting bolt 6. The airfoil blade 2 is mounted by means of two removable fasteners 5, 6 to the flexbeam 3 and the control cuff 4.

The control cuff 4 is provided with fairing means 10 encompassing the removable fasteners 5, 6, said flexbeam head 20 and the root end of the airfoil blade 2. The fairing means 10 are bevel shaped towards a free end 23 next to an opposed curb 22 of the root end 21 of said airfoil blade 2. For a smooth transition between fairing means 10 and airfoil blade 2 the curb 22 at the root end 21 of said airfoil blade 2 is profiled for alignment with the fairing means 10 and the root end 21 of said airfoil blade 2 for minimized aerodynamic resistance at operation of said airfoil blade 2.

Figure 3:
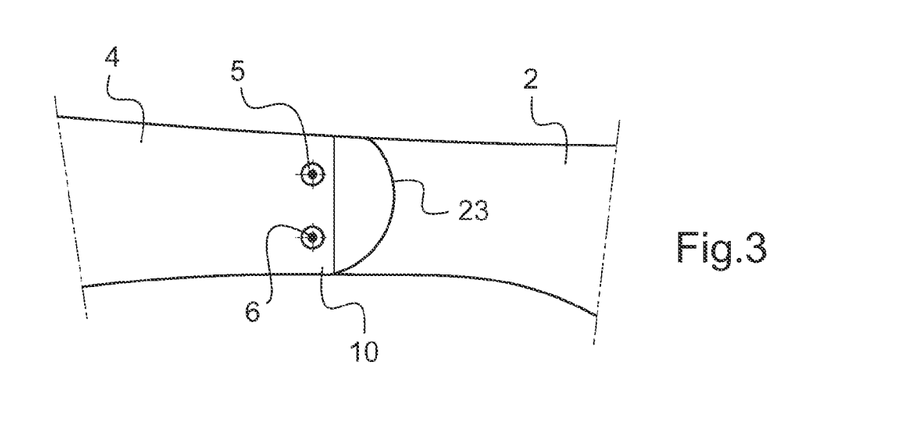
FIG. 3 is a top view of the flexbeam of the aerodynamic blade attachment according to FIG. 2.

According to FIG. 3 corresponding features are referred to with the references of FIG. 1, 2. The flexbeam 3, the root end 21 of the airfoil blade 2 and the control cuff 4 each have respectively two matching holes for reception of the main bolt 5 and the supporting bolt 6, said two bolts 5, 6 being asymmetric with regard to the middle axis of the flexbeam 3. The airfoil blade 2 is mounted by means of the two removable fasteners 5, 6 to the flexbeam 3 and the control cuff 4.

The fairing means 10 are formed with a circular segment 23 at its free end adjacent to the opposed curb 22 of the root end 21 of said airfoil blade 2. The center of said circular segment 23 is identical with the central axis of the main bolt 5 of the removable fasteners and consequently the radius of said circular segment 23 is identical with the distance of the central axis of the main bolt 5 from the circular segment 23. The radius of the circular segment 23 is at least big enough to allow the circular segment 23 to reach from the leading edge 13 to the trailing edge 14 of the control cuff 14.

Figure 4:
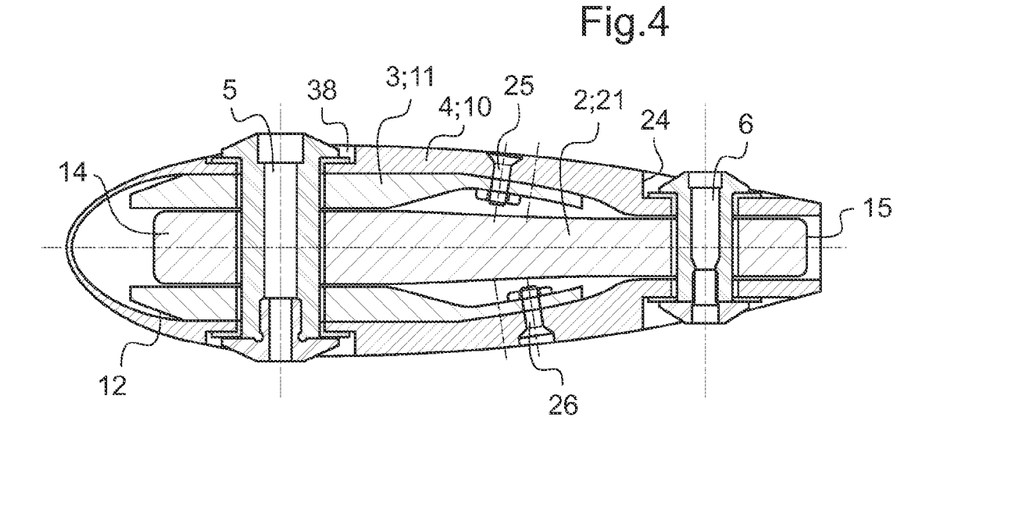
FIG. 4 is a cross sectional view at a different scale along an axis rectangular to the view of the aerodynamic blade attachment according to FIG. 2.

According to FIG. 4 corresponding features are referred to with the references of FIG. 1-3. The root end 21 of the airfoil blade 2, the control cuff 4 and the flexbeam 3 each have coaxially a hole for a main bolt 5 as a connection means of the blade attachment 1. Said holes for the main bolt 5 are in the area of the 25% pitch axis of a profile section for said airfoil blade 2 at about a maximal height of the blade attachment 1. The root end 21 of the airfoil blade 2 and the control cuff 4 each have coaxially a further hole for a supporting bolt 6 as a connection means of the aerodynamic blade attachment 1. Said holes for the supporting bolt 6 in an area at the rear edge 15 of the airfoil blade 2 are distant from the holes for the main bolt 5 in an area at the leading edge 14 of the airfoil blade 2.

The main bolt 5 has a greater diameter than the supporting bolt 6 to allow a load of 60% of the centrifugal loads of the airfoil blade 2 to be carried by said main bolt 5. The main bolt 5 is located at 10%-30% of the chord width of the airfoil blade 2. The supporting bolt 6 is located at 50%-90% of the chord width of the airfoil blade 2. The distance of the main bolt 5 from the supporting bolt 6 is between 40% to 80% of the chord width of the airfoil blade 2.

The main bolt 5 and the supporting bolt 6 together with any screw nuts are integrated aerodynamically into respectively associated corrugations 24, 38 of fairing means 10 of said control cuff 4.

The control cuff 4 is riveted at upper and lower mechanical connections 25, 26 to the upper fork flange 18 and the lower fork flange 19 of the fork shaped head 20 of the flexbeam 3. Additionally the control cuff 4 adheres to the upper fork flange 11 and the lower fork flange 12 of the fork shaped head 20 of the flexbeam 3. The control cuff 4 is built up with carbon layers with an orientation of +/−45°.

Figure 5:
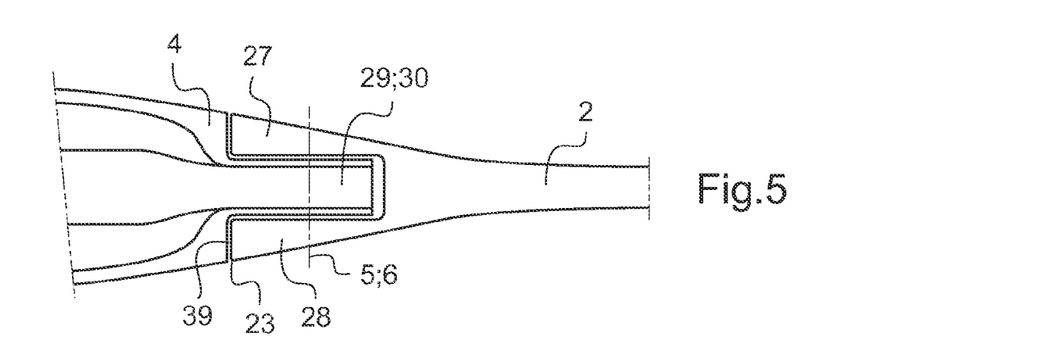
FIG. 5 is a cross sectional view of a further embodiment of the aerodynamic blade attachment according to the invention.

According to FIG. 5 corresponding features are referred to with the same references as in FIG. 1-4. The root end of the airfoil blade 2 receives between upper and lower airfoil flanges 27, 28 a rectangular end 29 of a compact flexbeam head 30. The control cuff 4 is adapted from outside to upper and lower sides of the rectangular end 29 of the compact flexbeam head 30 and from inside to upper and lower sides of the airfoil flanges 27, 28. The airfoil blade 2 is mounted by means of two removable fasteners 5, 6 to the flexbeam 3 and the control cuff 4.

The upper and lower airfoil flanges 27, 28 are conceived as fairing means encompassing the removable fasteners 5, 6, said flexbeam head 20 and the control cuff 4. The control cuff 4 is conceived as fairing means with its adapted circumference 39 to the respective circumferences of the upper and lower airfoil flanges 27, 28.

Figure 6:
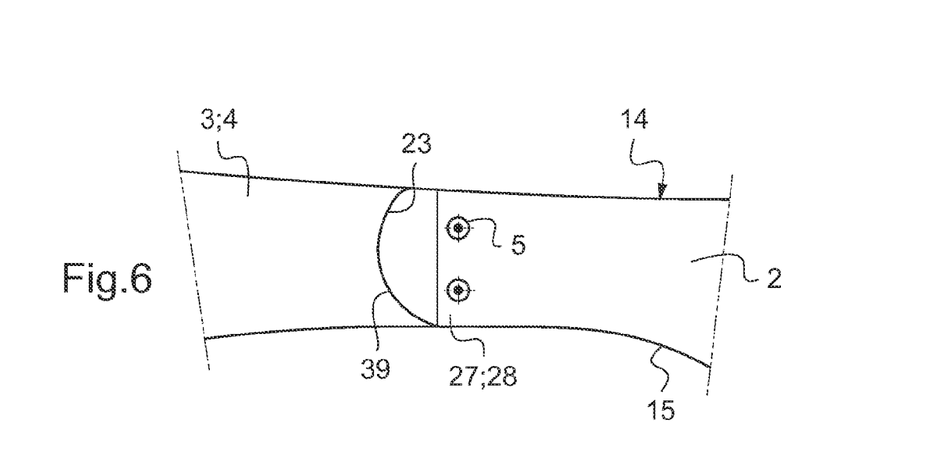
FIG. 6 is a top view of the flexbeam of the aerodynamic blade attachment according to FIG. 4.

According to FIG. 6 corresponding features are referred to with the same references as in FIG. 1-5. The fairing means 10 are formed respectively with circular segments 23 at the free ends of the upper and lower airfoil flanges 27, 28 of the root end 21 of said airfoil blade 2. The center of said circular segment 23 is identical with the central axis of the main bolt 5 of the removable fasteners and consequently the radius of said circular segment 23 is identical with the distance of the central axis of the main bolt 5 from the circular segment 23. The circular segments 23 at the free ends of the upper and lower airfoil flanges 27, 28 of the root end 21 of said airfoil blade 2 are constantly close to the adapted circumference 39 of the control cuff 4.

Figure 7:
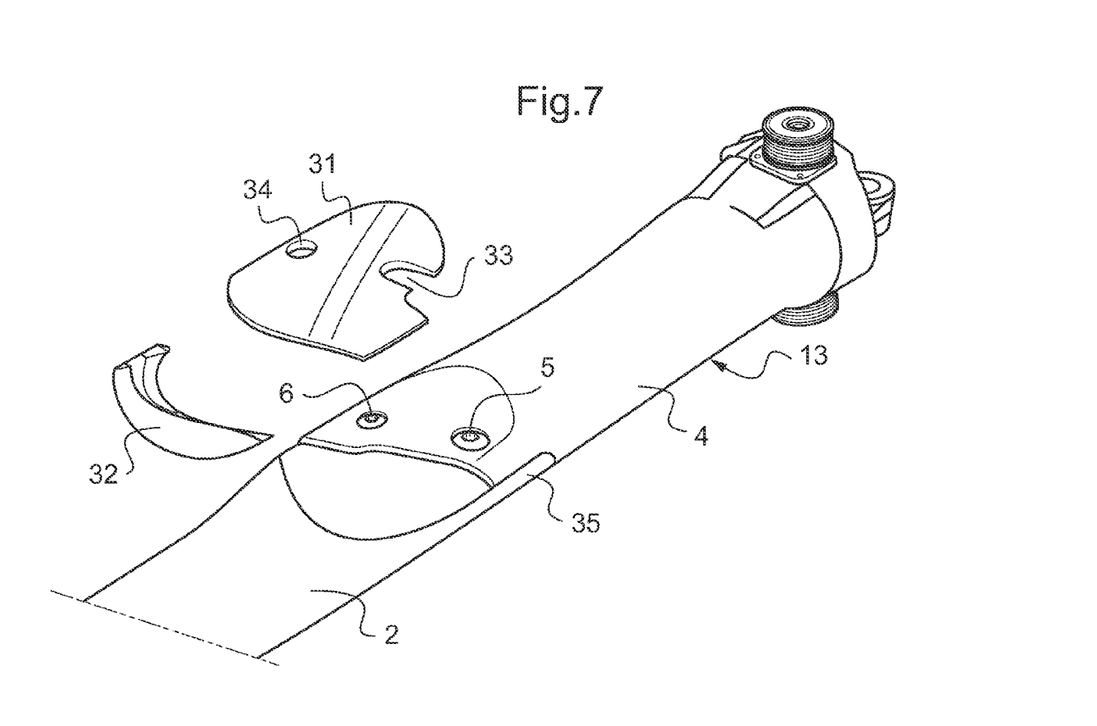
FIG. 7 is a perspective view of a rotor section with a still further embodiment of the aerodynamic blade attachment according to the invention.

According to FIG. 7 corresponding features are referred to with the same references as in FIG. 1-6. The fairing means are formed as supplemental profiles 31, 32 for assembly with the control cuff 4 at said junction arrangement for the airfoil blade 2, the control cuff 22 and the flexbeam 21. Holes 33, 34 are integrated into said supplemental profile 31 for accommodation of the removable fasteners 5, 6 for assembly of the control cuff 4, the airfoil blade 2 and the flexbeam 3.

The control cuff 4 is further provided with the forward slit 35 along the peak of the leading edge 13 of the control cuff 4. The height of the forward slit 35 is determined by the height of the airfoil blade 2. The depth of the forward slit 35 from the free end of the control cuff 4 towards the root end of the control cuff 4 is equal to the distance of the main bolt 5 from the free end of the control cuff 4 towards the root end of the control cuff 4 plus the distance of the main bolt 5 from the leading edge 13 of the control cuff 4, if the maximum forward folding angle for the airfoil blade 2 is not more than 90°.

If the maximum forward folding angle for the airfoil blade 2 is more than 90° the depth of the forward slit 35 follows trigonometric rules, e.g. if the maximum forward folding angle for the airfoil blade 2 is 135° the depth of the forward slit 35 results as the distance of the main bolt 5 from the free end of the control cuff 4 towards the root end of the control cuff 4 plus twice the distance of the main bolt 5 from the leading edge 13 of the control cuff 4. Corresponding rules apply for the depth of the rearward slit 11 from the free end of the control cuff 4 towards the root end of the control cuff 4 with the difference that instead of the distance of the main bolt 5 it is the distance of the supporting bolt 6 from the free end of the control cuff 4 towards the root end of the control cuff 4 plus the distance of the supporting bolt 6 from the trailing edge 12 of the control cuff 4 that determine the depth of the rearward slit 11. According to FIG. 8 corresponding features are referred to with the same references as in FIG. 1-7.

Figure 8:
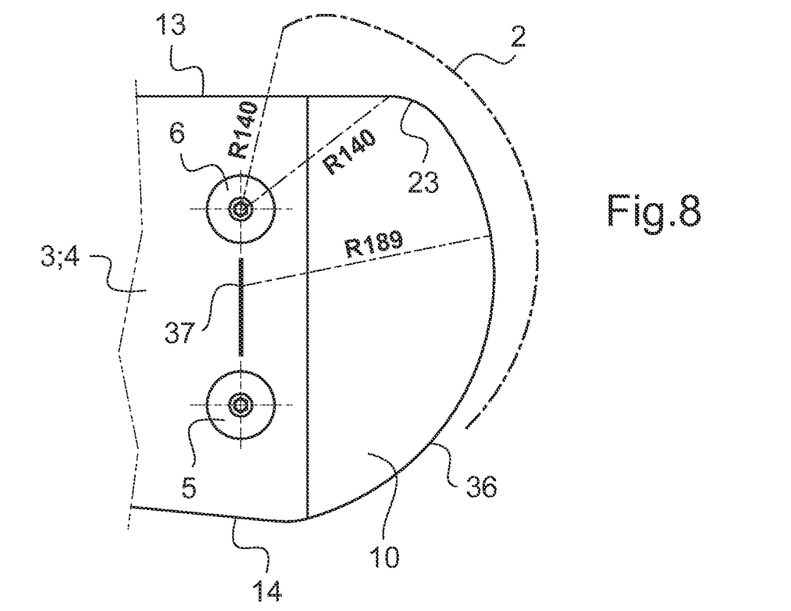
FIG. 8 is a top view of a detail of the aerodynamic blade attachment according to the invention.

The aerodynamic blade attachment 1 connects the airfoil blade 2 to the flexbeam 3 and the control cuff 4 by means of the main bolt 5 and the supporting bolt 6. For pivoting the airfoil blade 2 relative to the flexbeam 3 and the control cuff 4 of the aerodynamic blade attachment 1 the supporting bolt 6 is removed from the junction arrangement but the main bolt 5 is maintained in place. Without any other fixation of the airfoil blade 2 to the flexbeam 3 and the control cuff 4 the airfoil blade 2 is able to rotate relative to the flexbeam 3 and the control cuff 4 with the center of said rotation being the central axis of the main bolt 5.

The fairing means 10 are formed respectively with two circular segments 23, 36 at each of the upper and lower free ends. The center of the first circular segment 23 is identical with the central axis of the main bolt 5 of the removable fasteners. The first circular segment 23 joins the leading edge 13 of control cuff 4 smoothly.

The center 37 of the second circular segment 36 is offset from the center of the first circular segment 23 and the radius $r_2$=189 mm of the second circular segment 36 is greater than the radius $r_1$=140 mm of the circular segment 23. The offset is 50 mm from the central axis of the main bolt 5 towards the central axis of the supporting bolt 6 and towards the profile middle. The second circular segment 36 joins the trailing edge 14 of control cuff 4 smoothly.

The first circular segment 23 of the fairing means 10 at the free end of control cuff 4 is relatively short compared to the second circular segment 36 of said fairing means 10 and the second circular segment 36 joins the first circular segment 23 smoothly.

The greater radius $r_2$ and the offset have as a consequence that correspondingly shaped opposed fairing means 22, 27, 28 of the airfoil blade 2 adjacent to the fairing means 10 at the free end of control cuff 4 in an operating position of the rotor take off from the free end of the fairing means 10 of control cuff 4 once the airfoil blade 2 is rotated with its leading edge 14 towards the leading edge 13 of the control cuff 4.

Figure 9:
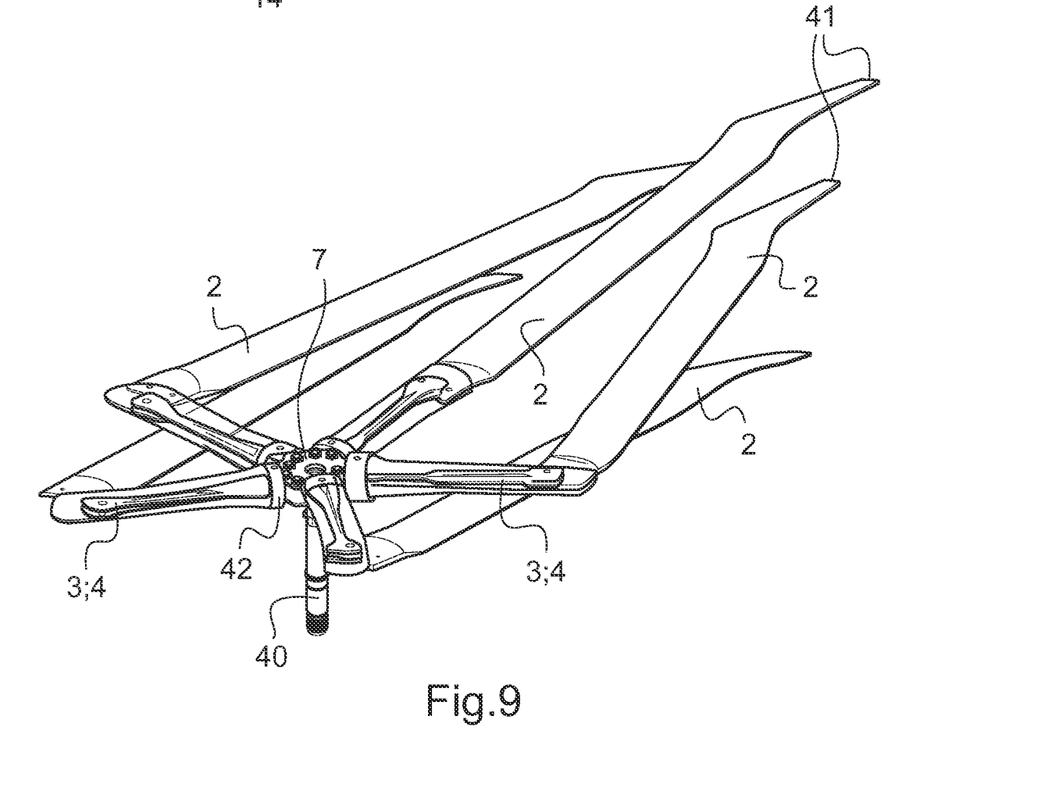
FIG. 9 is a top view of pivoted airfoil blades of the aerodynamic blade attachment according to the invention.

According to FIG. 9 corresponding features are referred to with the same references as in FIG. 1-8. A bearingless rotor, particularly a main rotor, of a helicopter, comprises an airfoil blade 2 having a tip end 41 and a root end 42 next to a rotor head 7. Four of five airfoil blades 2 are pivoted around their respective blade attachments 1 to essentially parallel arrangements with each other. Pivoting angles of up to 144° approach the leading edges 14 of the airfoil blades 2 to the leading edges 13 of the control cuff 4. The control cuffs 2 with integrated flexbeams 3 remain in radial positions rectangular to a rotor head axis 40 through the rotor head 7.

REFERENCE LIST 1 blade attachment
2 airfoil blade
3 flexbeam
4 control cuff
5 removable fastener, main bolt
6 removable fastener, supporting bolt 7 rotor head
8 damper
9 pitch control
10 fairing means
11 rearward slit
12 trailing edge
13 leading edge
14 leading edge
15 trailing edge
17 gap
18 upper fork flange
19 lower fork flange
20 flexbeam head
21 root end
22 curb
23 circular segment
24 corrugation
25 rivet
26 rivet
27 upper airfoil flange
28 lower airfoil flange
29 rectangular end
30 compact flexbeam head
31 fairing means
32 fairing means
33 hole
34 hole
35 forward slit
36 circular segment
37 center offset
38 corrugation
39 adapted circumference
40 rotor head axis
41 tip end
42 root end

What is claimed is:

1. An aerodynamic blade attachment for a bearingless rotor of a helicopter, comprising:
an airfoil blade having a tip end and a root end forming opposite ends thereof and having a pitch axis from the tip end to the root end;
a flexbeam;
a control cuff enclosing and extending along at least a predominant portion of the flexbeam; and
a separable junction arrangement between the flexbeam, the control cuff and the root end of the airfoil blade, the junction arrangement being mechanical between the flexbeam, the control cuff and the root end of the airfoil blade with a removable main bolt and a removable supporting bolt respectively removable connecting the root end of the airfoil blade and the control cuff with the flexbeam, the junction arrangement comprising fairing means encompassing the main bolt and the supporting bolt and the flexbeam, wherein the fairing means are formed with a first circular segment and a second circular segment at a free end of the control cuff, the root end of the blade having corresponding first and second circular segments, a first center of the first circular segment being aligned with a central axis of the main bolt, a second center of the second circular segment being offset from the first center and between the central axis of the main bolt and a central axis of the supporting bolt, a radius of the second circular segment being greater than a radius of the first circular segment.

2. The aerodynamic blade attachment according to claim 1, wherein the fairing means are provided by the control cuff.

3. The aerodynamic blade attachment according to claim 1, wherein the fairing means are provided by the root end of the airfoil blade.

4. The aerodynamic blade attachment according to claim 1, wherein the fairing means are provided by at least one supplemental profile.

5. The aerodynamic blade attachment according to claim 4, wherein the at least one supplemental profile, is mounted either to the root end of the airfoil blade and/or to the control cuff.

6. The aerodynamic blade attachment according to claim 1, wherein the offset is 10-15 mm.

7. The aerodynamic blade attachment according to claim 1, wherein the radius of the first circular segment or the radius of the second circular segment is greater than the distance from the main bolt or the supporting bolt to the free end.

8. The aerodynamic blade attachment according to claim 1, wherein the main bolt and the supporting bolt are asymmetric with regard to a middle axis of the flexbeam.

9. The blade attachment according to claim 8, wherein the main bolt is arranged in the area of a 10-30% chord of a profile section of the airfoil blade, respectively slightly in front of the chord towards a leading edge of the profile section.

10. The blade attachment according to claim 8, wherein the main bolt is hollow.

11. The blade attachment according to claim 8, wherein the main bolt and the supporting bolt together with any screw nuts are integrated aerodynamically into respectively associated corrugations of the fairing means.

12. The blade attachment according to claim 8, wherein the flexbeam head is fork shaped to accommodate the main bolt and the supporting bolt.

13. The blade attachment according to claim 8, wherein the root end of the airfoil blade is fork shaped, the flexbeam has a flat stepped cross section and the root end of the airfoil blade is arranged inbetween the control cuff and the flexbeam.

14. The blade attachment according to claim 1, wherein the control cuff is provided with a frontal slit and a rear slit adjacent to the flexbeam.

15. The blade attachment according to claim 1, wherein the first circular segment is contiguous with the second circular segment.

16. A blade assembly for a bearingless helicopter rotor, comprising:
a flexbeam having a first end and a second end, the first end being configured to couple to a rotor head;
a control cuff extending about a portion of the flexbeam, the control cuff having a free end with an arcuate profile having a first circular segment and a second circular segment;
a blade extending from a root to a tip, the blade having a pitch axis extending from the root to the tip, the root having a corresponding arcuate profile to the control cuff with a corresponding first circular segment and a corresponding second circular segment;
a first bolt coupling the control cuff free end to the blade root; and
a second bolt coupling the control cuff free end to the blade root, wherein the first circular segment is concentric with the first bolt, the second circular segment has a center offset from the first bolt and second bolt and positioned between a central axis of the first bolt and a central axis of the second bolt, the second circular segment has a different radius from the first circular segment, and wherein the first bolt or the second bolt couples the flexbeam second end to the blade root and control cuff free end.

17. The blade assembly of claim 16, wherein the arcuate profile of the control cuff free end is a convex arcuate profile.

18. The blade assembly of claim 16, wherein the cuff has a generally planar upper surface and the arcuate profile lies within the general plane of the upper surface.

19. A rotorcraft comprising: a rotor head;
a flexbeam having a first end and a second end, the first end being coupled to the rotor head;
a control cuff extending about a portion of the flexbeam, the control cuff having a free end with an arcuate profile having a first circular segment and a second circular segment;
a blade extending from a root to a tip, the blade having a pitch axis extending from the root to the tip, the root having a corresponding arcuate profile to the control cuff with a corresponding first circular segment and a corresponding second circular segment; a first bolt coupling the control cuff free end to the blade root; and a second bolt coupling the control cuff free end to the blade root, wherein the first circular segment is concentric with the first bolt, the second circular segment has a center offset from the first bolt and second bolt and positioned between a central axis of the first bolt and a central axis of the second bolt, the second circular segment has a different radius from the first circular segment, and wherein the first bolt or the second bolt couples the flexbeam second end to the blade root and control cuff free end.

* * * * *